(12) United States Patent
Yamagami et al.

(10) Patent No.: US 11,893,718 B2
(45) Date of Patent: Feb. 6, 2024

(54) IMAGE RECOGNITION METHOD AND IMAGE RECOGNITION DEVICE (71) Applicant: MURATA MACHINERY, LTD., Kyoto (JP)

(72) Inventors: Seiji Yamagami, Kyoto (JP); Munekuni Oshima, Ise (JP)

(73) Assignee: MURATA MACHINERY, LTD., Kyoto (JP)

(*) Notice: Subject to any disclaimer, the term of this patent is extended or adjusted under 35 U.S.C. 154(b) by 96 days.

(21) Appl. No.: 17/623,662

(22) PCT Filed: Apr. 17, 2020

(86) PCT No.: PCT/JP2020/016941
§ 371 (c)(1),
(2) Date: Dec. 29, 2021

(87) PCT Pub. No.: WO2021/009986
PCT Pub. Date: Jan. 21, 2021

(65) Prior Publication Data
US 2022/0253994 A1 Aug. 11, 2022

(30) Foreign Application Priority Data
Jul. 12, 2019 (JP) ................. 2019-130264

(51) Int. Cl.
G06T 5/50 (2006.01)
G06T 7/174 (2017.01)
(Continued)

(52) U.S. Cl.
CPC .............. G06T 5/50 (2013.01); G06T 7/174 (2017.01); G06V 10/7715 (2022.01);
(Continued)

(58) Field of Classification Search
CPC . G06T 5/50; G06T 7/174; G06T 2207/20224; G06T 7/00; G06T 5/001;
(Continued)

(56) References Cited

U.S. PATENT DOCUMENTS

2015/0269190 A1* 9/2015 Shih ................. G06F 18/22
382/104
2018/0349741 A1* 12/2018 Yasutomi ............ G06F 18/2431
(Continued)

FOREIGN PATENT DOCUMENTS

| JP | 5082512 B2 | 11/2012 | |
| JP | 6429823 B2 | 11/2018 | |
| WO | WO-2019003953 A1 * | 1/2019 | ............. G06T 15/04 |

OTHER PUBLICATIONS

Official Communication issued in corresponding European Patent Application No. 20840239.6, dated Dec. 8, 2022.
(Continued)

Primary Examiner — Dhaval V Patel
(74) Attorney, Agent, or Firm — Keating & Bennett, LLP (57) ABSTRACT A method of recognizing a specific image includes detecting image features from the specific image and storing in a memory each of detected relevant image features, detecting relevant image features from an input image and selecting from the memory a portion corresponding to each of the detected relevant image features, generating a restoration image using portions selected in the selecting, and determining whether the generated restoration image matches with the input image by a matching process and recognizing that, when it is determined that the restoration image matches with the input image, the input image is the specific image.

16 Claims, 10 Drawing Sheets (51) Int. Cl.
*G06V 20/59* (2022.01)
*G06V 10/77* (2022.01)
(52) U.S. Cl.
CPC .... *G06V 20/59* (2022.01); *G06T 2207/20224* (2013.01); *G06V 2201/07* (2022.01)
(58) Field of Classification Search
CPC .............. G06V 10/7715; G06V 20/59; G06V 2201/07; G06V 20/58; G06V 10/30; G06V 10/74; G06V 10/82; G06V 20/588; G06V 20/56; G06V 20/70; A63F 3/02
See application file for complete search history.

(56) References Cited

U.S. PATENT DOCUMENTS

| | | | | |
|---|---|---|---|---|
| 2019/0095467 A1* | 3/2019 | Kislyuk | ................ | G06F 16/738 |
| 2021/0082184 A1* | 3/2021 | Claessen | ................ | G06T 17/00 |
| 2021/0142551 A1* | 5/2021 | Kobayashi | .............. | G06T 15/04 |

OTHER PUBLICATIONS

Zhao, "An Autoencoder-Based Image Descriptor for Image Matching and Retrieval", Wright State University, https://core.ac.uk/download/pdf/80836629.pdf, 2016, 94 pages.

* cited by examiner

IMAGE RECOGNITION METHOD AND IMAGE RECOGNITION DEVICE

BACKGROUND OF THE INVENTION

1. Field of the Invention

Aspects of the present invention relate to image recognition methods and image recognition devices.

2. Description of the Related Art

As a technique concerning an image recognition method of recognizing a specific image, an information processing apparatus described in Japanese Patent No. 5082512 has been known, for example. The information processing apparatus described in Japanese Patent No. 5082512 extracts a partial image from an image that was input. The extracted partial image is compared with a partial image that has been already registered, and whether they are similar is determined.

SUMMARY OF THE INVENTION

In the above-described technique, because the image recognition is performed based on whether each image feature of a specific image is included, even if the image can be easily distinguished as an image different from the specific image by human visual observation, it may be erroneously recognized as a specific image when a large number of the same image feature are included.

Preferred embodiments of the present invention provide image recognition methods and image recognition devices each capable of recognizing a specific image with high accuracy.

An image recognition method according to a preferred embodiment of the present invention is a method of recognizing a specific image and includes a first step of detecting a plurality of relevant image features from the specific image and storing in a memory each of the detected relevant image features as a portion, a second step of detecting a plurality of relevant image features from an input image and selecting from the memory a portion corresponding to each of the detected relevant image features, a third step of generating a restoration image by using a plurality of portions selected in the second step, and a fourth step of determining whether the restoration image generated in the third step matches with the input image by a matching process and recognizing that, when it is determined that the restoration image matches with the input image, the input image is the specific image.

This image recognition method, when generating the restoration image, uses the portions detected from the specific image. Consequently, when an image other than the specific image is input as an input image, it is not possible to correctly generate the input image as the restoration image. Thus, by determining whether the input image matches with the restoration image, the match or mismatch between the input image and the specific image (whether the input image is the specific image or other images) can be determined with high accuracy. That is, it is possible to recognize the specific image with high accuracy.

In an image recognition method according to a preferred embodiment of the present invention, in the first step, a portion label as a label may be given to each of the portions, and the portion label may be stored in the memory together with the portion, and in the second step, a selection label as a label may be given to each of the image features, and the portion of the portion label that matches with the selection label may be selected. In this way, the generation process of the restoration image can be efficiently performed.

In an image recognition method according to a preferred embodiment of the present invention, the second step may include an image cutting process of cutting out an input image from a captured image as a distance image, and in the image cutting process, a point cloud of a depth distance within a predetermined range in the captured image may be assumed as a relevant object, and an image of the relevant object in the captured image may be cut out as the input image. In this way, the input image can be generated from the captured image.

In an image recognition method according to a preferred embodiment of the present invention, in the second step, a feature intensity of each of the image features may be detected, and in the third step, the restoration image may be generated by further using the plurality of feature intensities detected in the second step. In this way, the restoration image can be accurately generated.

In an image recognition method according to a preferred embodiment of the present invention, the specific image may be an image of at least a portion of a vehicle body in a traveling vehicle traveling along a predetermined traveling path. In this case, an image recognition method according to a preferred embodiment of the present invention can be applied to the image recognition of the vehicle body of the traveling vehicle.

An image recognition device according to a preferred embodiment of the present invention is a device that recognizes a specific image and includes a memory to store therein each of a plurality of image features detected from the specific image as a portion in advance, a feature detector to detect a plurality of relevant image features from an input image, a restorer to select from the memory the portion corresponding to each of the relevant image features detected by the feature detector and to generate a restoration image by using a plurality of selected portions, and a determiner to determine whether the restoration image generated in the restorer matches with the input image by a matching process and to recognize that, when it is determined that the restoration image matches with the input image, the input image is the specific image.

This image recognition device, when generating the restoration image, uses the portions detected from the specific image. Consequently, when an image other than the specific image is input as an input image, it is not possible to correctly generate the input image as the restoration image. Thus, by determining whether the input image matches with the restoration image, the match or mismatch between the input image and the specific image (whether the input image is the specific image or other images) can be determined with high accuracy. That is, it is possible to recognize the specific image with high accuracy.

In an image recognition device according to a preferred embodiment of the present invention, the memory may store therein a label given to each of a plurality of portions as a portion label together with the portion in advance, the feature detector may give a selection label as a label to each of the image features, and the restorer may select the portion of the portion label that matches with the selection label. In this way, the generation process of the restoration image can be efficiently performed.

An image recognition device according to a preferred embodiment of the present invention may include an image cutter to cut out the input image from a captured image as a distance image, and the image cutter may assume as a relevant object a point cloud of a depth distance within a predetermined range in the captured image and may cut out an image of the relevant object in the captured image as the input image. In this way, the input image can be generated from the captured image.

In an image recognition device according to a preferred embodiment of the present invention, the feature detector may detect a feature intensity of each of the image features, and the restorer may generate the restoration image by further using the plurality of feature intensities detected by the feature detector. In this way, the restoration image can be accurately generated.

In an image recognition device according to a preferred embodiment of the present invention, the specific image may be an image of at least a portion of a vehicle body in a traveling vehicle traveling along a predetermined traveling path. In this case, an image recognition device according to a preferred embodiment of the present invention can be applied to the image recognition of the vehicle body of the traveling vehicle.

According to preferred embodiments of the present invention, it is possible to provide image recognition methods and image recognition devices each capable of recognizing a specific image with high accuracy.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

With reference to the accompanying drawings, the following describes preferred embodiments of the present invention in detail. In the following description, identical or equivalent elements are denoted by identical reference signs, and redundant explanations are omitted.

Figure 1:
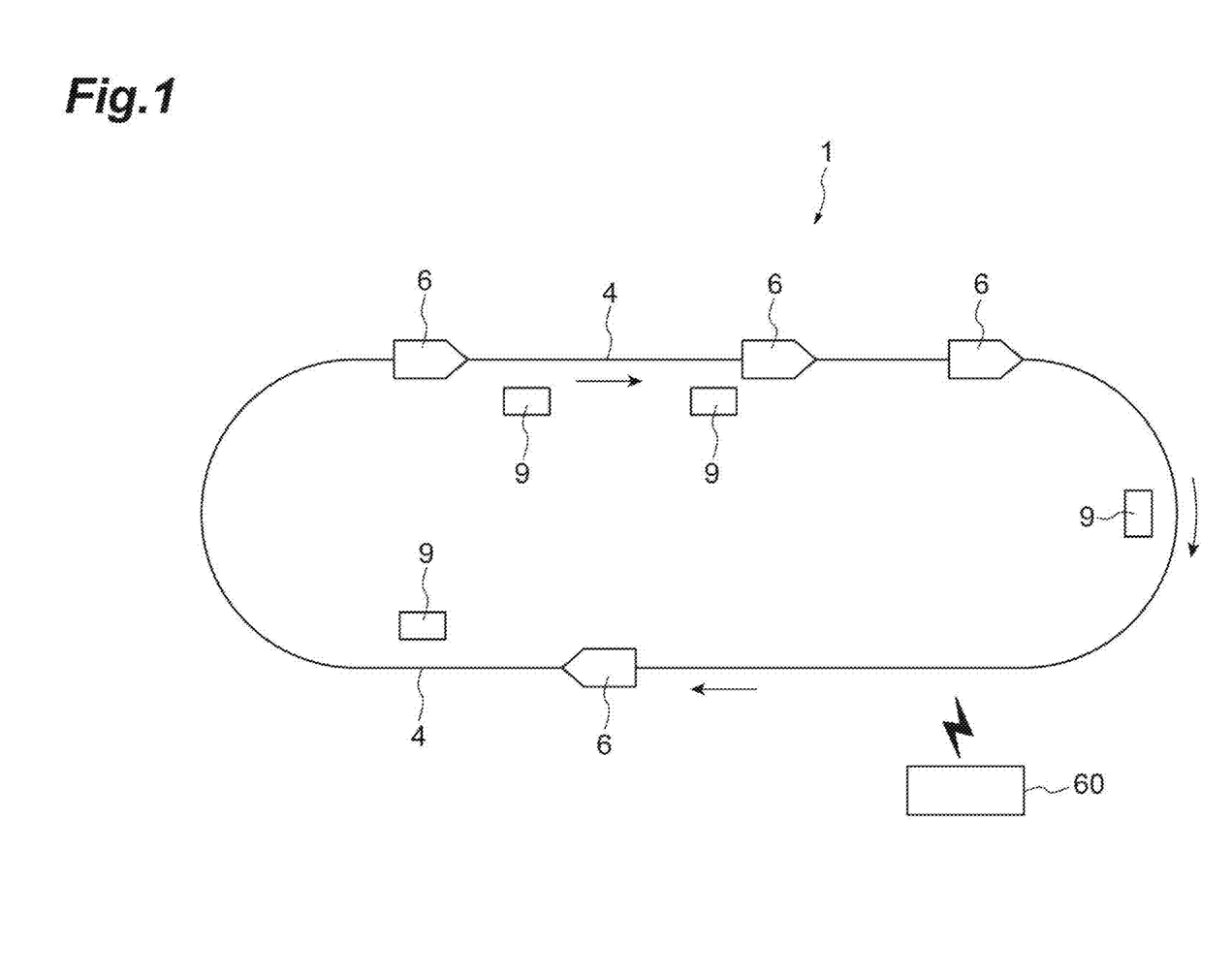
FIG. 1 is a schematic plan view illustrating a traveling vehicle system to which an image recognition device according to a preferred embodiment of the present invention is applied.

An image recognition device according to the present preferred embodiment is applied to a traveling vehicle system. Thus, first, the traveling vehicle system will be described. As illustrated in FIG. 1, a traveling vehicle system 1 is a system for transferring, by using a traveling vehicle 6 capable of moving along a track 4, an article 10 between placement portions 9 and 9. The article 10 includes a container such as a FOUP (Front Opening Unified Pod) to store a plurality of semiconductor wafers and a reticle pod to store a glass substrate, and general components and the like, for example. The traveling vehicle system 1 includes the track 4, a plurality of traveling vehicles 6, a plurality of placement portions 9, and a system controller 60.

Figure 2:
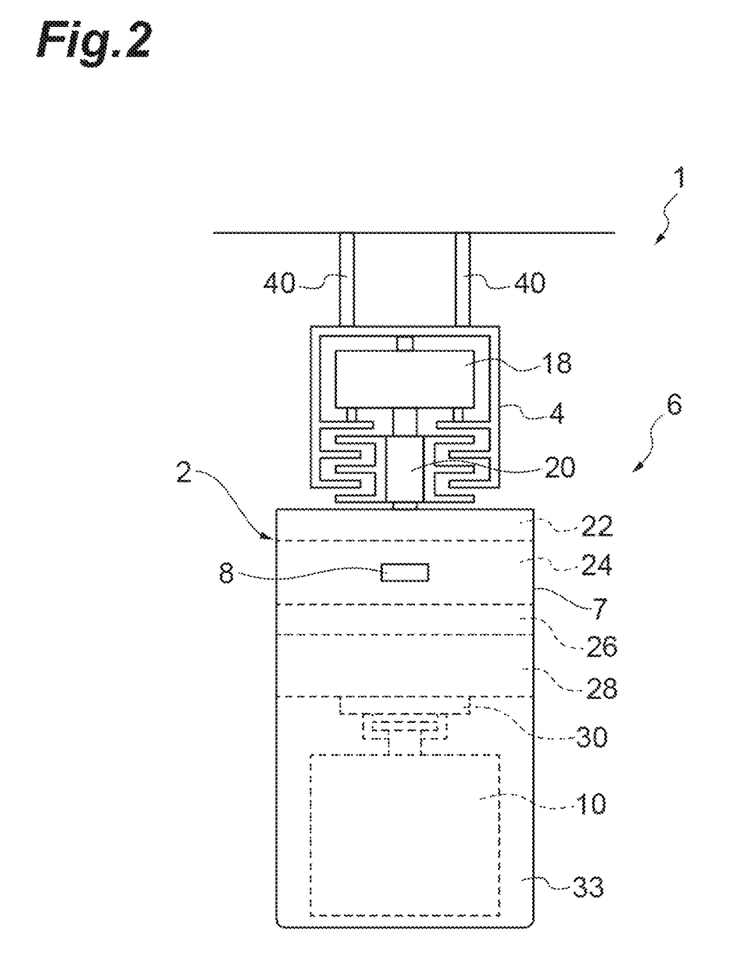
FIG. 2 is a schematic front view of a traveling vehicle in FIG. 1 as viewed from a traveling direction.

As illustrated in FIG. 2, the track 4 is laid near the ceiling that is an overhead space for workers in a factory and the like, for example. The track 4 is suspended from the ceiling, for example. The track 4 is a predetermined traveling path for the traveling vehicles 6 to travel along. The track 4 is a one-way traveling path, for example. The track 4 is supported by supporting columns 40 and 40.

The traveling vehicle 6 travels along the track 4 and transports the article 10. The traveling vehicle 6 is configured such that the article 10 can be transferred. The traveling vehicle is an overhead-traveling automatic guided vehicle (overhead traveling vehicle). The number of traveling vehicles 6 included in the traveling vehicle system 1 is not particularly limited and is more than one. As illustrated in FIG. 2, the traveling vehicle includes a vehicle body 2. The vehicle body 2 includes a traveling portion 18, a main body portion 7, a camera 8, and a traveling-vehicle controller 50 (see FIG. 3).

The main body portion 7 includes a main body frame 22, a lateral feed portion 24, a θ drive 26, an elevating drive portion 28, an elevating table 30, and a fall prevention cover 33. The traveling portion 18 includes a motor and the like and causes the traveling vehicle 6 to travel along the track 4. The traveling portion 18 includes a power-receiving communicator 20 that receives power from the track 4 side by a non-contact power supply, for example.

The lateral feed portion 24 transversely feeds the θ drive 26, the elevating drive portion 28, and the elevating table collectively in a direction perpendicular or substantially perpendicular to the traveling direction of the track 4. The θ drive 26 turns at least one of the elevating drive portion 28 and the elevating table 30 within a predetermined angle range in a horizontal plane. The elevating drive portion 28 raises and lowers the elevating table 30 by winding or feeding out suspending material such as a wire, a rope, and a belt. The elevating table 30 is provided with a chuck, so that the article 10 can be freely grasped or released. The fall prevention cover 33 is provided in a pair at the front and rear of the traveling vehicle 6 in the traveling direction, for example. The fall prevention covers 33 prevent the article 10 from falling during transfer by making claws and the like not depicted appear and disappear.

As illustrated in FIG. 1 and FIG. 2, the placement portions 9 are arranged along the track 4 and are provided at locations where delivery of the article 10 to and from the traveling vehicle 6 can be allowed. The placement portions 9 each include a buffer and a delivery port. The buffer is a placement portion on which the article 10 is temporarily placed. The buffer is a placement portion on which the article 10 is temporarily placed when, due to, for example, another article 10 being placed on an intended delivery port and the like, the article 10 that the traveling vehicle 6 is transporting cannot be transferred to the relevant delivery port. The delivery port is a placement portion to perform the delivery of the article 10 to and from a semiconductor processing device including a cleaning device, a film-forming device, a lithography device, an etching device, a heat treatment device, and a flattening device. For example, the placement portions 9 are arranged on the lateral side of the track 4. The placement portions 9 may be arranged directly below the track 4.

The camera 8 captures an image of the front of the traveling vehicle 6 itself and acquires a captured image including the traveling vehicle 6 located in front of the traveling vehicle 6 itself. The captured image in this case is a distance image. The camera 8 is arranged on the fall prevention cover 33 provided on the front side of the traveling vehicle 6. The camera 8 transmits the captured image to the traveling-vehicle controller 50. The camera 8 is not particularly limited, and various known devices may be used. For example, the camera 8 may acquire the distance image by a stereo vision method. The distance image is also referred to as a three-dimensional distance image or an image having three-dimensional information.

Figure 3:
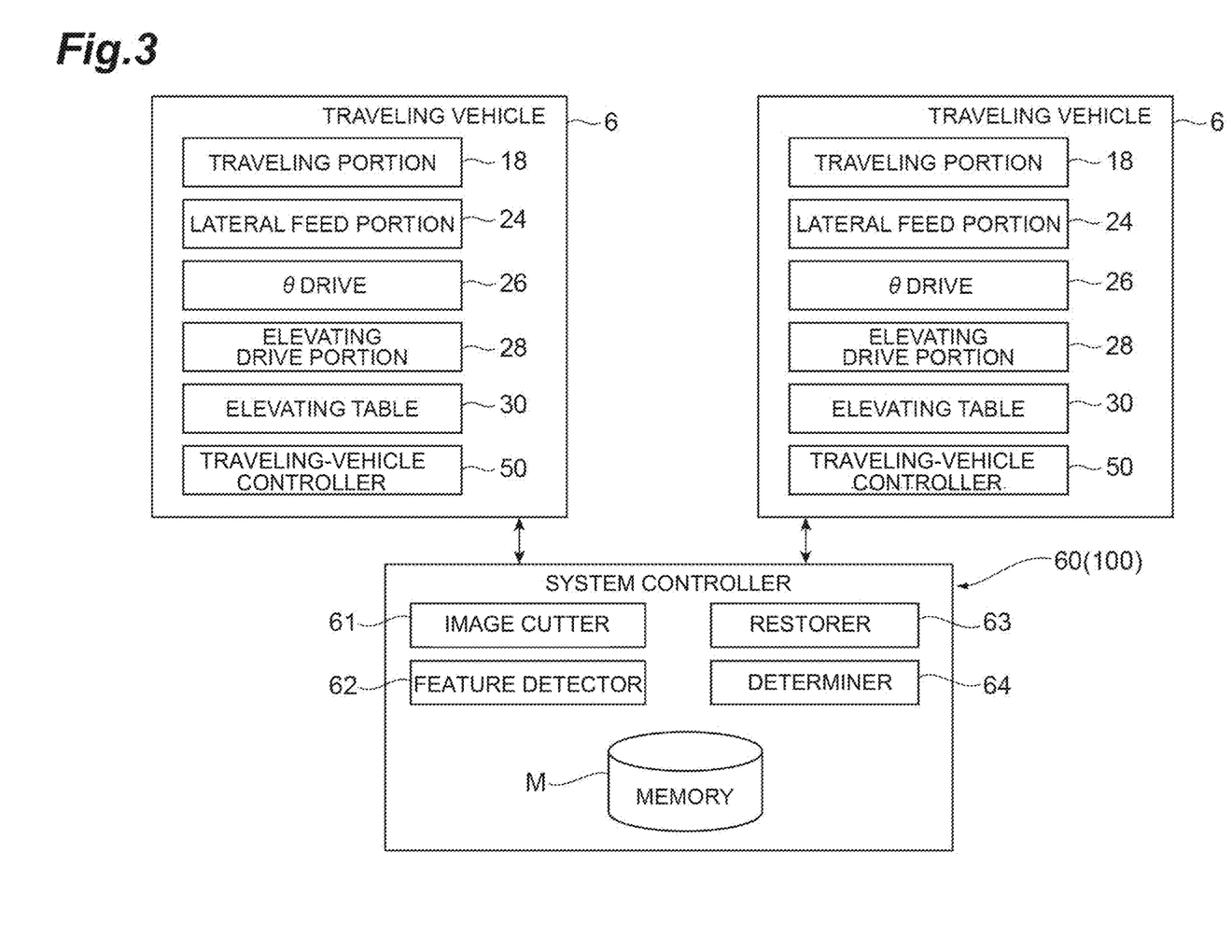
FIG. 3 is a block diagram illustrating a functional configuration of the traveling vehicle system in FIG. 1.

As illustrated in FIG. 2 and FIG. 3, the traveling-vehicle controller 50 is an electronic controller configured or programmed to include a CPU (Central Processing Unit), a ROM (Read Only Memory), a RAM (Random Access Memory), and the like. The traveling-vehicle controller 50 controls various operations in the traveling vehicle 6. Specifically, the traveling-vehicle controller 50 controls the traveling portion 18, the lateral feed portion 24, the θ drive 26, the elevating drive portion 28, and the elevating table 30. The traveling-vehicle controller 50 can be configured as software for which a program stored in the ROM is loaded onto the RAM and executed by the CPU, for example. The traveling-vehicle controller 50 may be configured as hardware (computer) by an electronic circuit or the like. The traveling-vehicle controller 50 performs communication with the system controller 60 by using a communication line (feeder line) and the like of the track 4.

The system controller 60 is an electronic controller configured or programmed to include a CPU, a ROM, a RAM, and the like. The system controller 60 can be configured as software for which a program stored in the ROM is loaded onto the RAM and executed by the CPU, for example. The system controller 60 may be configured as hardware (computer) by an electronic circuit or the like. The system controller 60 transmits a transport command that causes the traveling vehicle 6 to transport the article 10. The system controller 60 of the present preferred embodiment includes an image recognition device 100. The following describes the image recognition device 100. This image recognition device 100 may be provided in the traveling vehicle 6.

The image recognition device 100 is capable of recognizing a specific image. As one example, the specific image is an image of the vehicle body 2 of the traveling vehicle 6. The image recognition device 100 includes a memory M, an image cutter 61, a feature detector 62, a restorer 63, and a determiner 64.

The memory M stores therein each of a plurality of image features detected (extracted) from the specific image as a portion in advance. The method for detecting image features from the specific image is not particularly limited, and various known methods can be used. For example, by passing the specific image through an image filter, the image features may be detected. The memory M stores therein in advance a label given to each of a plurality of portions together with the portion defining a portion label. The portion functions, as will be described later, as a seed for image restoration by the restorer 63.

The image feature is the feature of the image and is also referred to as a feature amount or a feature point of the image. The acquisition of a plurality of portions may be performed by using a learned model (AI: artificial intelligence) obtainable by deep learning using the L2 norm. The label indicates information for identifying an object to which the label is given. The label is not particularly limited and is, for example, a number.

The image cutter 61 cuts out an input image from the captured image. Specifically, the image cutter 61 assumes, as an object (object candidate), a point cloud (a block of points having a similar distance) of the depth distance within a predetermined range in the captured image. The image cutter 61 cuts out, as an input image, an image of the relevant object in the captured image. The predetermined range is not particularly limited and can be set in advance. The cutting of the input image from the captured image may be performed by using a learned model (AI: artificial intelligence) obtainable by deep learning, such as YOLOv3, for example.

The feature detector 62 detects a plurality of image features from the input image. The method for detecting image features from the input image is not particularly limited, and various known methods can be used. For example, the feature detector 62 may detect the image features by passing the input image through an image filter. The feature detector 62 gives a selection label as a label to each of the image features. The feature detector 62 detects the feature intensity of each of the image features. The feature intensity is an index indicating the strength with which the relevant image feature is related to the input image. The feature intensity can indicate the degree that the image feature contributes to in the input image.

On each of the image features detected by the feature detector 62, the restorer 63 selects from the memory M the portion corresponding the image feature. The restorer 63 selects from the memory M the portions having the portion label that matches with the selection label of the image feature detected by the feature detector 62. The restorer 63 generates a restoration image by using a plurality of selected portions. The restorer 63 generates the restoration image by further using the feature intensity of the image features detected by the feature detector 62. The method for generating a restoration image using a plurality of portions is not particularly limited, and various known methods such as an auto-encoder configured with a deep neural network, for example, can be used.

The determiner 64 determines whether the restoration image generated in the restorer 63 matches with the input image by a matching process. The determiner 64 recognizes that, when it is determined that the restoration image matches with the input image, the input image is the specific image. The matching process is not particularly limited, and various known methods such as the L2 norm, for example, can be used. The determiner 64 may calculate the similarity of the restoration image to the input image and determine that, when the relevant similarity is greater than or equal to a threshold value, the restoration image matches with the input image.

Next, one example of detecting a plurality of image features from the input image by the feature detector 62 will be described with reference to FIG. 4.

Figure 4:
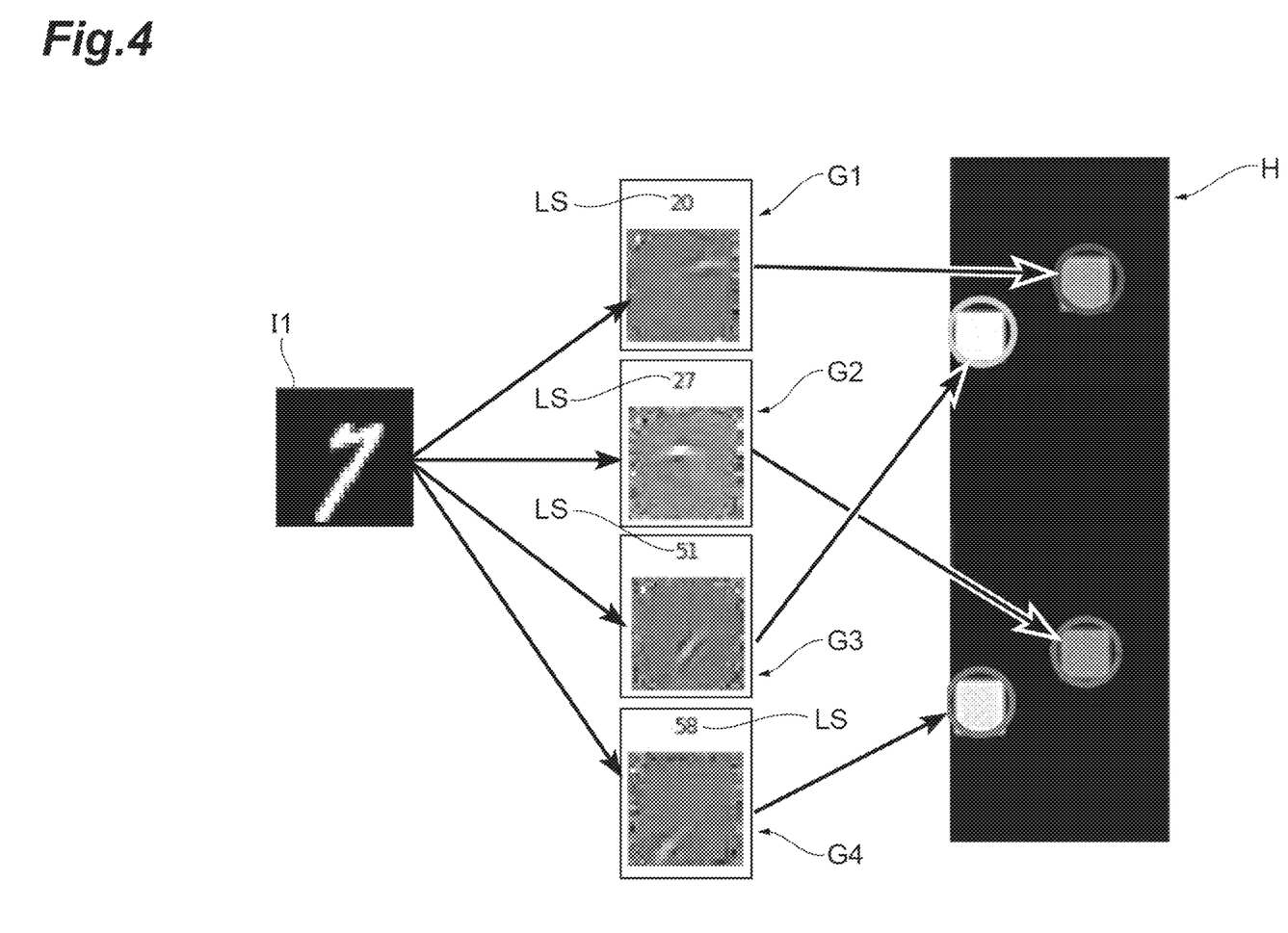
FIG. 4 is a diagram for explaining one example of detecting a plurality of image features from an input image by a feature detector of the image recognition device in FIG. 3.

As illustrated in FIG. 4, in the description of this case, an image of "numeral 7" is used as the input image, for convenience. With the feature detector 62, a plurality of image features are detected from an input image I1. In the illustrated example, an image feature G1 with a selection label LS of "20", an image feature G2 with a selection label LS of "27", an image feature G3 with a selection label LS of "51", and an image feature G4 with a selection label LS of "58" are detected. Then, these are acquired as an image-feature detection result H. In the image-feature detection result H, the feature intensity of each of the image features G1 to G4 is indicated as brightness. In this way, a plurality of image features G1 to G4 can be mechanically detected from the input image I1.

Next, one example of restoring an image by the restorer 63 based on the image features G1 to G4 will be described with reference to FIG. 5.

Figure 5:
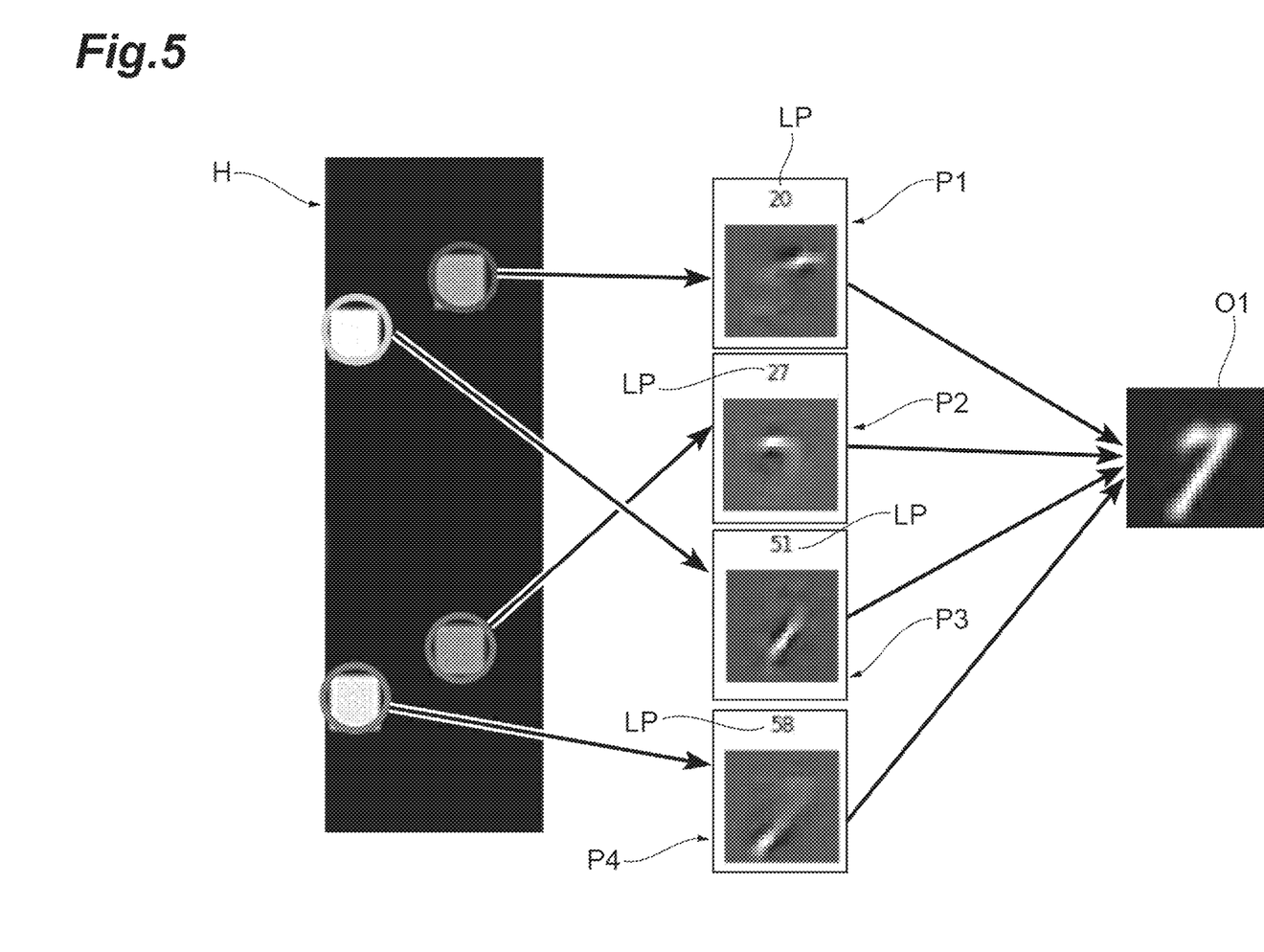
FIG. 5 is a diagram for explaining one example of generating a restoration image by a restorer of the image recognition device in FIG. 3.

As illustrated in FIG. 5, by the restorer 63, based on the image-feature detection result H, portions P1 to P4 of portion labels LP matching with the selection labels LS of the image features G1 to G4 (see FIG. 4) are selected from the memory M. With the restorer 63, a restoration image O1 is generated using a plurality of selected portions P1 to P4. In this way, the restoration image O1 can be restored from the image features G1 to G4.

Next, an image recognition method that is performed by the image recognition device 100 will be described.

Figure 6:
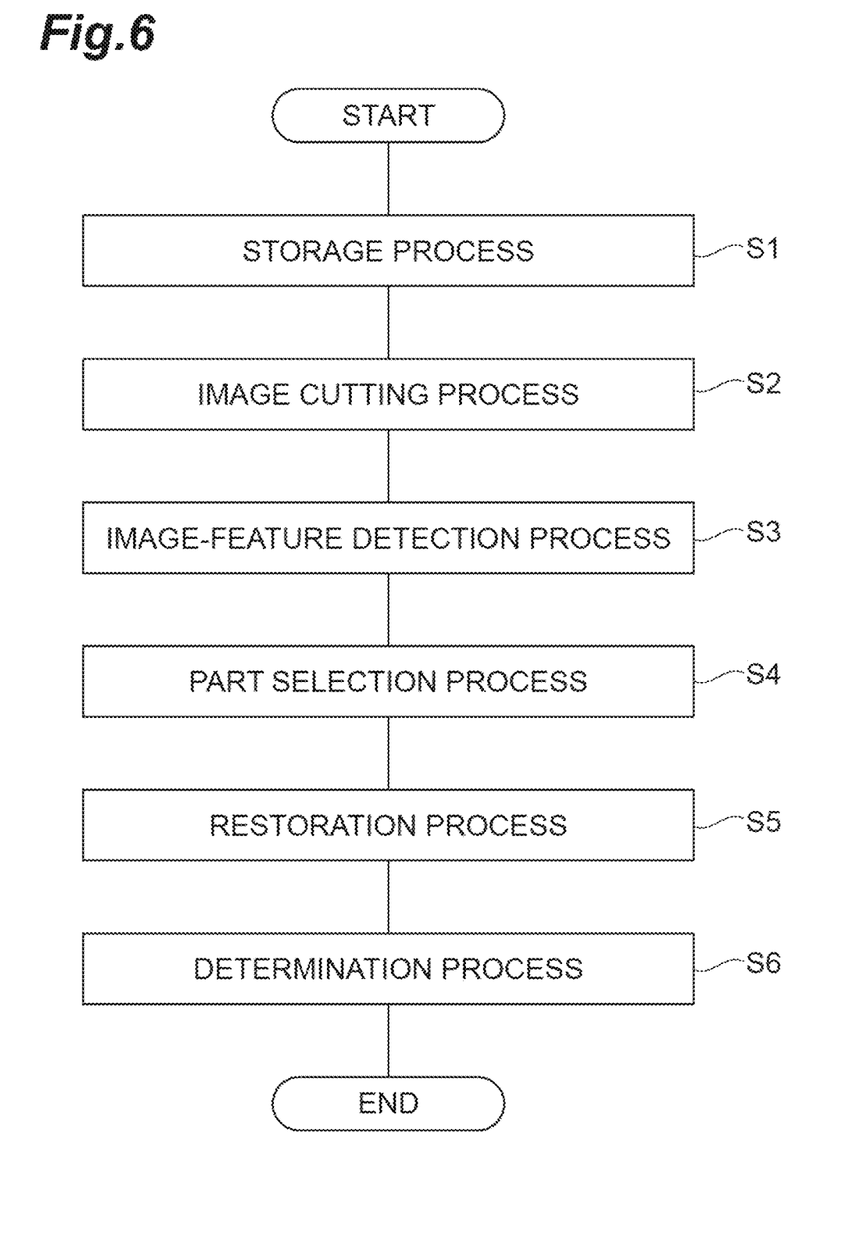
FIG. 6 is a flowchart illustrating an image recognition method according to a preferred embodiment of the present invention.

The image recognition method is a method of recognizing a specific image. As illustrated in FIG. 6, first, a plurality of image features are detected from a specific image, and each of the detected relevant image features is stored in the memory M as a portion (storage process: Step S1). In the storage process, the portion label as a label is given to each of a plurality of portions, and the portion label is stored in the memory M together with the portion.

Subsequently, from the captured image acquired by the camera 8, an input image is cut out by the image cutter 61 (image cutting process: Step S2). In the image cutting process, a point cloud of the depth distance within a predetermined range in the captured image is assumed as an object, and the image of the relevant object in the captured image is cut out as an input image.

Then, with the feature detector 62, a plurality of image features are detected from the input image that has been cut out in the image cutting process (image-feature detection process: Step S3). In the image-feature detection process, a selection label is given to each of the image features as a label. In the image-feature detection process, the feature intensity of each of the image features is detected.

Subsequently, with the restorer 63, a portion corresponding to each of the image features detected in the image-feature detection process is selected from the memory M (portion selection process: Step S4). In the portion selection process, the portions having the portion label that matches with the selection label are selected.

Then, with the restorer 63, by using a plurality of portions selected in the portion selection process, a restoration image is generated (restoration process: Step S5). In the restoration process, the restoration image is generated by further using the plurality of feature intensities detected in the image-feature detection process. Finally, by the determiner 64, whether the restoration image generated in the restoration process matches with the input image is determined by the matching process (determination process: Step S6). In the determination process, when it is determined that the restoration image matches with the input image, the input image is recognized as the specific image.

In the foregoing example, the first step includes the storage process, the second step includes the image cutting process and the portion selection process the third step includes the restoration process, and the fourth step includes the determination process.

Next, one example of recognizing a specific image by the above-described image recognition method will be described. In the following description, a case of recognizing the vehicle body 2 of the traveling vehicle 6 as the specific image will be exemplified.

Figure 7A:
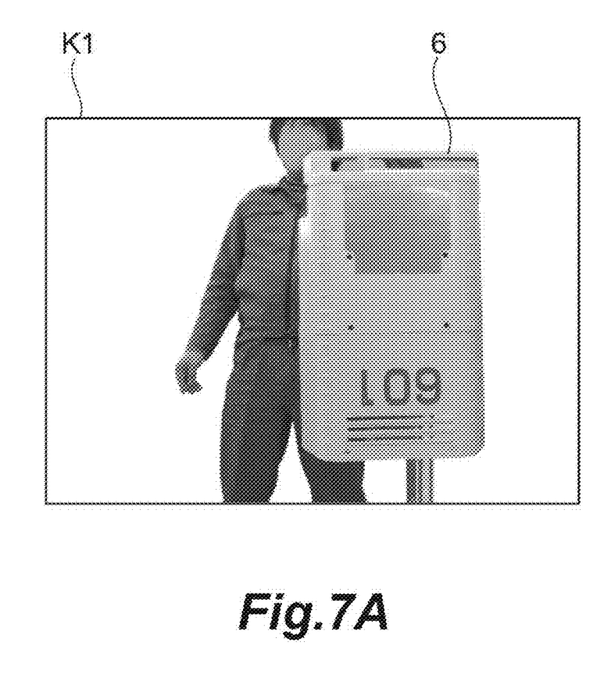
FIG. 7A is a diagram illustrating one example of a captured image.
Figure 7B:
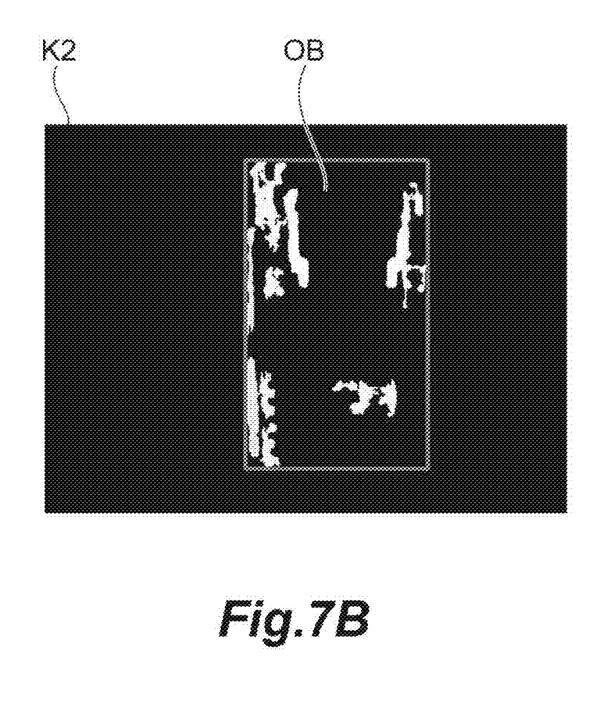
FIG. 7B is a diagram illustrating one example of depth distance data.
Figure 8A:
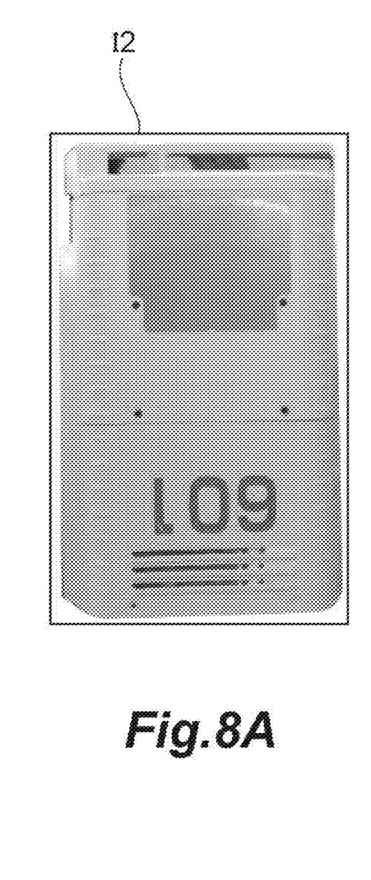
FIG. 8A is a diagram illustrating one example of an input image.

As illustrated in FIG. 7A, with the camera 8, a captured image K1 including the traveling vehicle 6 located in front of the traveling vehicle 6 itself is acquired. As illustrated in FIG. 7B, with the image cutter 61, depth distance data K2 in the captured image K1 is calculated and a point cloud of the depth distance within a predetermined range is assumed as an object OB. As illustrated in FIG. 7A and FIG. 8A, the image of the relevant object OB in the captured image K1 is cut out as an input image I2.

Figure 8B:
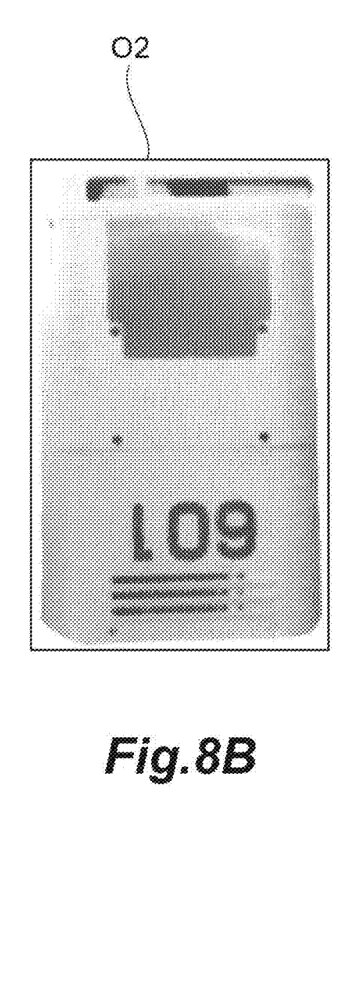
FIG. 8B is a diagram illustrating a restoration image restored from the input image in FIG. 8A.

As illustrated in FIG. 8B, a plurality of image features are detected from the input image I2 by the feature detector 62, and a restoration image O2 is generated by the restorer 63. With the determiner 64, whether the restoration image O2 matches with the input image I2 is determined by the matching process. In the example illustrated in FIGS. 8A and 8B, it is determined that the restoration image O2 matches with the input image I2 (similarity is greater than or equal to the threshold value), and the input image I2 is recognized as the specific image (image of the vehicle body 2 of the traveling vehicle 6).

Figure 9A:
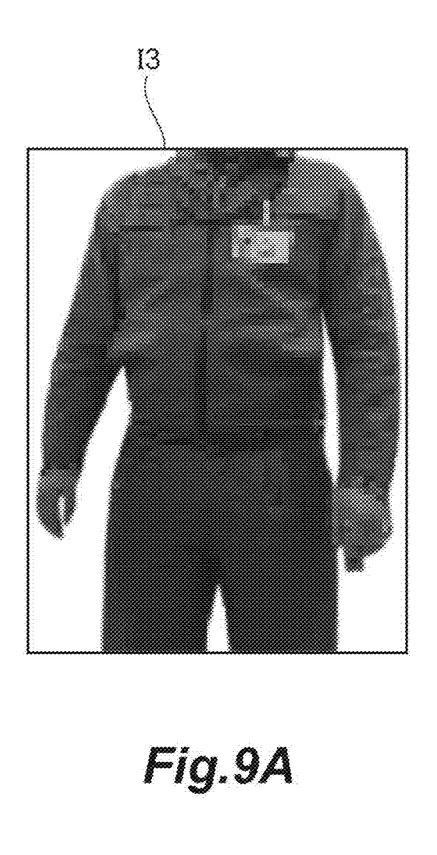
FIG. 9A is a diagram illustrating one example of an input image.
Figure 9B:
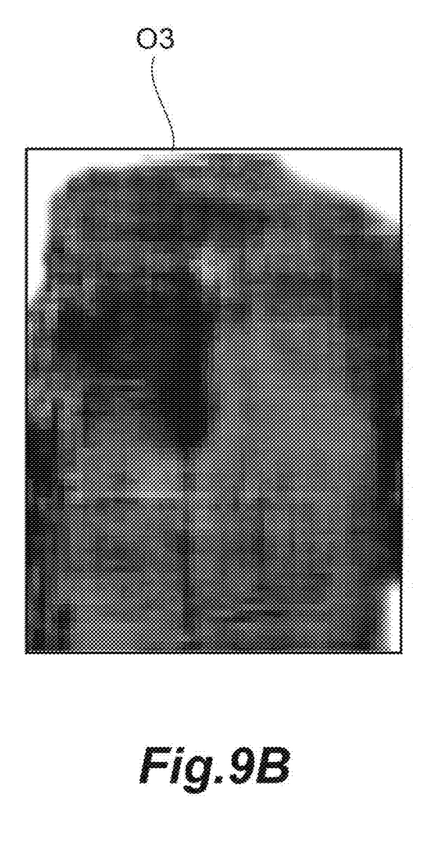
FIG. 9B is a diagram illustrating a restoration image restored from the input image in FIG. 9A.
Figure 10A:
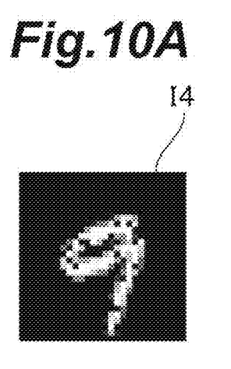
FIG. 10A is a diagram illustrating one example of an input image.
Figure 10B:
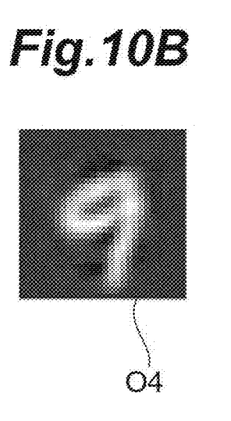
FIG. 10B is a diagram illustrating a restoration image restored from the input image in FIG. 10A.
Figure 10C:
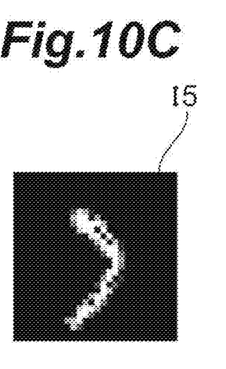
FIG. 10C is a diagram illustrating one example of an input image.
Figure 10D:
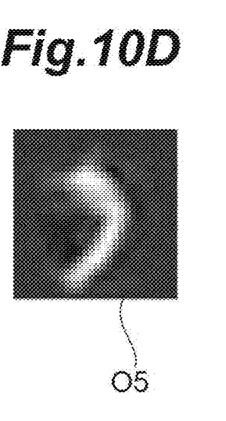
FIG. 10D is a diagram illustrating a restoration image restored from the input image in FIG. 10C.
Figure 10E:
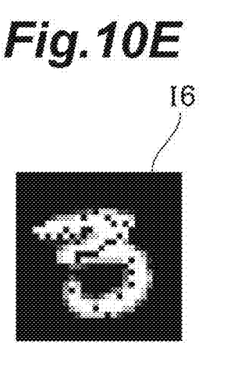
FIG. 10E is a diagram illustrating one example of an input image.
Figure 10F:
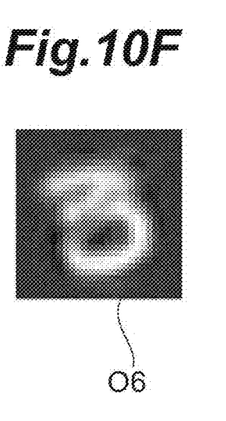
FIG. 10F is a diagram illustrating a restoration image restored from the input image in FIG. 10E.
Figure 10G:
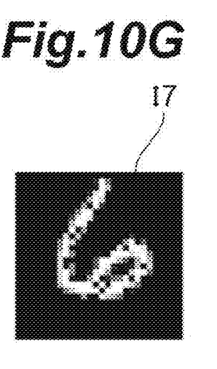
FIG. 10G is a diagram illustrating one example of an input image.
Figure 10H:
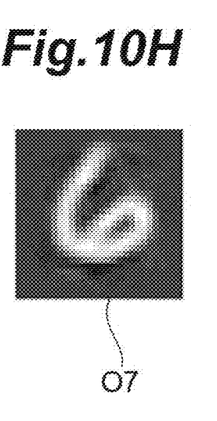
FIG. 10H is a diagram illustrating a restoration image restored from the input image in FIG. 10G.
Figure 10I:
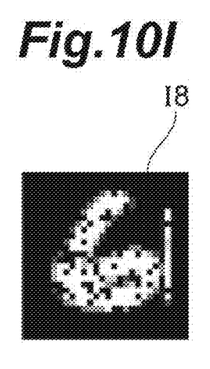
FIG. 10I is a diagram illustrating one example of an input image.
Figure 10J:
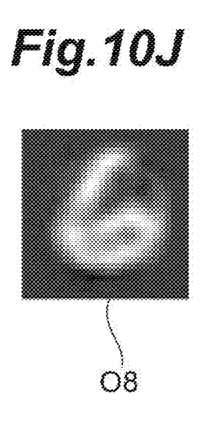
FIG. 10J is a diagram illustrating a restoration image restored from the input image in FIG. 10I.

Meanwhile, as illustrated in FIG. 9A, when an image other than the vehicle body 2 of the traveling vehicle 6 (for example, an image of a body of a user and the like) is input as an input image I3, as illustrated in FIG. 9B, a restoration image O3 generated by the restorer 63 is not what the input image I3 is restored and has significant image collapse and blurring. Thus, in this example, it is determined that the restoration image O2 does not match with the input image I2 (similarity is below the threshold level), and the input image I3 is not recognized as the specific image (image of the vehicle body 2 of the traveling vehicle 6).

FIGS. 10A to 10J are each a diagram for explaining the robustness against noise of the feature detector 62 and the restorer 63. According to the image recognition device 100 and the image recognition method thereof, it is possible to detect a plurality of image features from an input image I4 (see FIG. 10A) by the feature detector 62, and generate a restoration image O4 (see FIG. 10B) by the restorer 63. A plurality of image features can be detected from an input image I5 (see FIG. 10C) by the feature detector 62, and a restoration image O5 (see FIG. 10D) can be generated by the restorer 63. A plurality of image features can be detected from an input image I6 (see FIG. 10E) by the feature detector 62, and a restoration image O6 (see FIG. 10F) can be generated by the restorer 63. A plurality of image features can be detected from an input image I7 (see FIG. 10G) by the feature detector 62, and a restoration image O7 (see FIG. 10H) can be generated by the restorer 63. A plurality of image features can be detected from an input image I8 (see FIG. 10I) by the feature detector 62, and a restoration image O8 (see FIG. 10J) can be generated by the restorer 63. From these results, it can be confirmed that, according to the image recognition device 100 and the image recognition method thereof, the above-described units have the ability to capture the features even if the input images I4 to I8 have noise and that the restoration images O4 to O8 are generated accurately.

As in the foregoing, the image recognition device 100 and the image recognition method thereof use the portions detected from a specific image when generating a restoration image. Thus, the image is restored in the patterns illustrated in the following (i), (ii), and (iii).
- (i) When the specific image is an input image, the input image is accurately restored as a restoration image.
- (ii) When an input image other than the specific image is input, the input image and the restoration image do not match.
- (iii) In particular, when an incorrect image that has image features of the specific image but is not the specific image is input as an input image, the specific image is restored as the restoration image while the input image and the restoration image do not match.

Thus, according to the image recognition device 100 and the image recognition method thereof, determining whether the input images I1 to I8 match with the restoration images O1 to O8 makes it possible to determine the match or mismatch between the input images I1 to I8 and the specific images (whether the input images I1 to I8 are the specific images or other images) with high accuracy. That is, it is possible to recognize the specific image with high accuracy. Determining that the input images I1 to I8 are the specific image if only the image features of the specific image are satisfied will result in misrecognition in the case of the above-described (iii), but the image recognition device 100 and the image recognition method thereof can avoid such misrecognition.

In the image recognition device 100 and the image recognition method thereof, the portion label LP as a label is given to each of a plurality of portions P1 to P4, and the portion labels LP are stored in the memory M together with the portions P1 to P4. The selection label LS as a label is given to each of a plurality of image features G1 to G4, and the portions P1 to P4 of the portion label LP that matches with the selection label LS are selected. In this way, the generation process of the restoration images O1 to O8 can be efficiently performed.

In the image recognition device 100 and the image recognition method thereof, from the captured image K1 as a distance image, the input image I2 is cut out. Specifically, where an object OB is a point cloud of the depth distance within a predetermined range in the captured image K1, the image of the relevant object OB in the captured image K1 is cut out as the input image I2. In this way, the input image I2 can be generated from the captured image K1.

In the image recognition device 100 and the image recognition method thereof, the feature intensity of each of the image features G1 to G4 is detected, and the restoration images O1 to O8 by further using a plurality of detected feature intensity are generated. In this way, the restoration images O1 to O8 can be accurately generated.

In the image recognition device 100 and the image recognition method thereof, the specific image is an image of the vehicle body 2 of the traveling vehicle 6. In this case, the image recognition device 100 and the image recognition method thereof can be applied to the image recognition of the vehicle body 2 of the traveling vehicle 6. The specific image may be the entire vehicle body 2 of the traveling vehicle 6 or may be an image of at least a portion of the vehicle body 2 of the traveling vehicle 6.

Example preferred embodiments have been described above. However, the present invention is not limited to the above-described preferred embodiments, and various modifications can be made without departing from the spirit of the present invention.

In the above-described preferred embodiments, a case where the image recognition device 100 is applied to the traveling vehicle system 1 and the vehicle body 2 of the traveling vehicle 6 is recognized has been exemplified, but the image recognition device 100 may be applied to other various devices or systems, and images of various objects may be designated as specific images. For example, the image recognition device 100 may be applied to an automatic winder, and the image of the wound package may be used as a specific image. For example, the image recognition device 100 may be applied to a lathe, and by designating an image of a non-defective processed product as a specific image, may be used to determine the quality of the processed product. For example, the image recognition device 100 may be used for the cutting of a region of a specific image from an image read by a scanner.

In the above-described preferred embodiment, the input image has been cut out from the captured image as a distance image, but such an image cutting process and an image cutter 61 may be not provided. As the camera 8, a general single-lens camera may be used, for example. The input image may be a distance image or may be a two-dimensional image.

In the traveling vehicle system 1 in the above-described preferred embodiments and modifications, an overhead traveling vehicle has been exemplified as one example of the traveling vehicle 6, but other examples of the traveling vehicle 6 include unmanned vehicles, stacker cranes, and the like that travel on a track laid out on the ground or a frame.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An image recognition method of recognizing a specific image, the method comprising:
- a first step of detecting a plurality of relevant image features from the specific image and storing in a memory each of the detected relevant image features as a portion;
- a second step of detecting a plurality of image features from an input image and selecting from the memory the portion corresponding to each of the detected relevant image features;
- a third step of generating a restoration image by using a plurality of portions selected in the second step; and
- a fourth step of determining whether the restoration image generated in the third step matches with the input image by a matching process and recognizing that, when it is determined that the restoration image matches with the input image, the input image is the specific image.

2. The image recognition method according to claim 1, wherein in the first step, a portion label as a label is given to each of the portions, and the portion label is stored in the memory together with a corresponding one of the portions; and in the second step, a selection label as a label is given to each of the relevant image features, and the portion of the portion label that matches with the selection label is selected.

3. The image recognition method according to claim 1, wherein the second step includes an image cutting process of cutting out an input image from a captured image as a distance image; and in the image cutting process, a point cloud of a depth distance within a predetermined range in the captured image is assumed as a relevant object, and an image of the relevant object in the captured image is cut out as the input image.

4. The image recognition method according to claim 1, wherein in the second step, a feature intensity of each of the image features is detected; and in the third step, the restoration image is generated by further using the plurality of feature intensities detected in the second step.

5. The image recognition method according to claim 1, wherein the specific image is an image of at least a portion of a vehicle body in a traveling vehicle traveling along a predetermined traveling path.

6. An image recognition device to recognize a specific image, the image recognition device comprising:

a memory to store therein each of a plurality of image features detected from the specific image as a portion in advance;

a feature detector to detect a plurality of relevant image features from an input image;

a restorer to select from the memory the portion corresponding to each of the relevant image features detected by the feature detector and to generate a restoration image by using a plurality of selected portions; and a determiner to determine whether the restoration image generated in the restorer matches with the input image by a matching process and to recognize that, when it is determined that the restoration image matches with the input image, the input image is the specific image.

7. The image recognition device according to claim 6, wherein the memory stores therein a label given to each of a plurality of portions as a portion label together with the portion in advance;

the feature detector gives a selection label as a label to each of the image features; and the restorer selects the portion of the portion label that matches with the selection label.

8. The image recognition device according to claim 6 further comprising:

an image cutter to cut out the input image from a captured image as a distance image; wherein the image cutter assumes as a relevant object a point cloud of a depth distance within a predetermined range in the captured image and cuts out an image of the relevant object in the captured image as the input image.

9. The image recognition device according to claim 6, wherein the feature detector detects a feature intensity of each of the image features; and the restorer generates the restoration image by further using the plurality of feature intensities detected by the feature detector.

10. The image recognition device according to claim 6, wherein the specific image is an image of at least a portion of a vehicle body in a traveling vehicle traveling along a predetermined traveling path.

11. The image recognition method according to claim 1, wherein, in the first step, the detected relevant image features are detected from the specific image by passing the specific image through an image filter.

12. The image recognition method according to claim 1, wherein, in the second step, the plurality of image features are detected from the input image by passing the input image through an image filter.

13. The image recognition method according to claim 1, wherein the matching process of the fourth step includes calculating a similarity of the restoration image to the input image and determining that, when the similarity is greater than or equal to a threshold value, the restoration image matches with the input image.

14. The image recognition device according to claim 6, further comprising an image filter to detect plurality of image features from the specific image.

15. The image recognition device according to claim 6, wherein the feature detector includes an image filter to detect the plurality of image features from the input image.

16. The image recognition device according to claim 6, wherein the matching process of the determiner includes calculating a similarity of the restoration image to the input image and determining that, when the similarity is greater than or equal to a threshold value, the restoration image matches with the input image.

* * * * *